(12) United States Patent
Ryu

(10) Patent No.: US 9,419,500 B2
(45) Date of Patent: Aug. 16, 2016

(54) MOTOR COMPRISING A PLATE MODULE

(71) Applicant: LG INNOTEK CO., LTD., Seoul (KR)

(72) Inventor: Woongseon Ryu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 296 days.

(21) Appl. No.: 13/929,518

(22) Filed: Jun. 27, 2013

(65) Prior Publication Data
US 2014/0001895 A1    Jan. 2, 2014

(30) Foreign Application Priority Data

Jun. 28, 2012  (KR) .................. 10-2012-0069847

(51) Int. Cl.
*H02K 11/00* (2016.01)
*H02K 3/52* (2006.01)

(52) U.S. Cl.
CPC ............ *H02K 11/0094* (2013.01); *H02K 3/522* (2013.01); *H02K 11/00* (2013.01)

(58) Field of Classification Search
CPC ... H02K 11/0094; H02K 3/522; H02K 15/02; H02K 3/525; H02K 5/225; H02K 15/0068; H02K 15/0056; H02K 3/00; H02K 5/14; H02K 5/148; H02K 13/02; H02K 11/00
USPC ..................................... 310/71, 89
IPC ...................................... H02K 11/00
See application file for complete search history.

(56) References Cited

U.S. PATENT DOCUMENTS

| | | | | |
|---|---|---|---|---|
| 4,115,915 | A * | 9/1978 | Godfrey | H02K 3/12 29/596 |
| 5,006,744 | A * | 4/1991 | Archer | H02K 29/06 310/58 |
| 5,537,270 | A * | 7/1996 | Morehouse | G11B 5/5521 360/97.18 |
| 6,020,660 | A * | 2/2000 | Wright | H02K 29/08 310/214 |
| 6,459,189 | B1 * | 10/2002 | Lloyd | 310/216.013 |
| 7,248,138 | B2 * | 7/2007 | Chiang et al. | 336/200 |
| 7,582,999 | B2 * | 9/2009 | Atkinson | H02K 3/50 310/179 |
| 8,040,006 | B2 * | 10/2011 | Murakami | 310/156.21 |
| 2007/0273218 | A1 * | 11/2007 | Atkinson | H02K 3/50 310/45 |
| 2008/0136274 | A1 * | 6/2008 | Fujii et al. | 310/71 |
| 2008/0218010 | A1 * | 9/2008 | Hino | H02K 3/522 310/71 |
| 2014/0001895 | A1 * | 1/2014 | Ryu | H02K 11/0094 310/71 |

FOREIGN PATENT DOCUMENTS

| | | |
|---|---|---|
| CN | 1122528 A | 5/1996 |
| CN | 1672308 A | 9/2005 |
| CN | 101106296 A | 1/2008 |

(Continued)

OTHER PUBLICATIONS

CN 1122528 A—English machine translation.*

(Continued)

*Primary Examiner* — John K Kim
(74) *Attorney, Agent, or Firm* — Saliwanchik, Lloyd & Eisenschenk

(57) ABSTRACT

A motor is provided, the motor including a motor housing, a stator mounted inside the motor housing and including a stator core and a coil wound on the stator core, a rotor rotatably installed at a center of the stator, and a plate module stacked with a plurality of plates, and coupled to the stator and to an upper surface of a rotor to supply an electric power to the coil.

15 Claims, 8 Drawing Sheets

(56) References Cited

FOREIGN PATENT DOCUMENTS

| | | |
|---|---|---|
| CN | 102340193 A | 2/2012 |
| JP | 08-079999 A | 3/1996 |
| JP | 2001275288 A | 10/2001 |
| JP | 2009-247138 A | 10/2009 |
| KR | 10-2008-0028100 A | 3/2008 |

OTHER PUBLICATIONS

Office Action dated Jun. 26, 2013 in Korean Application No. 10-2012-0069847, filed Jun. 28, 2012.

Office Action dated Apr. 20, 2015 in Chinese Application No. 201310265577.0.

* cited by examiner

MOTOR COMPRISING A PLATE MODULE

CROSS-REFERENCE TO RELATED APPLICATION

This application claims the benefit under 35 U.S.C. §119 of Korean Patent Application No. 10-2012-0069847, filed Jun. 28, 2012, which is hereby incorporated by reference in its entirety.

BACKGROUND

1. Field of the Disclosure

The present disclosure relates to a brushless motor.

2. Discussion of the Related Art

Generally, almost every vehicle employs an electric power-assist steering system. Such an electric power-assist steering system generates an assist force based on the steering torque and the steering angle in order to enhance the steering performance of the vehicle.

That is, a steering system that assists a steering force of a vehicle with a separate power is used to enhance the motion stability of a vehicle. Conventionally, the auxiliary steering device uses hydraulic pressure, but an Electronic Power Steering (EPS) system adapted to transmit a rotation output of an electric motor to a steering shaft via a speed reduction mechanism has been increasingly employed these days from a viewpoint of a reduction in engine load, a reduction in weight, an enhanced steering stability and a quick restoring force.

The EPS system is configured such that an Electronic Control Unit (ECU) drives a motor in response to steering conditions detected by a speed sensor, a torque angle sensor and a torque sensor to enhance a steering stability and provide a quick restoring force, whereby a driver can safely steer a vehicle.

The EPS system is also such that a motor assists a torque manipulating a steering wheel to allow a driver to steer a vehicle with less power, where the motor employs a Brushless Direct Current (BLDC) motor.

The BLDC motors have been increasingly used because the brushless motors are excellent in maintenance property, have a small size, and are capable of generating a high torque.

The BLDC motor generally forms an exterior look by coupling of a housing with a cover member, an inner circumferential surface of the housing is provided with a stator, and the stator is centrally formed with a rotor rotatably mounted in electrical interaction with the stator. The rotor is rotatably supported by a rotation shaft, and an upper surface of the rotation shaft is connected by a steering shaft of a vehicle to provide a power assisting the steering of the vehicle as mentioned above. The stator of EPS motor thus configured serves to supply an electric power to a wound coil via busbar.

The stator includes a core and a coil wound on the core, and in general, a motor used for a vehicle is employed with a plurality of coils connected in parallel for loss reduction. Thus, the coil is extended to an input/output terminal, and integrated and connected at the terminal during parallel connection. In order to integrate and connect the coil arranged in parallel, a busbar is coupled to an upper surface of the stator, and in order to couple the busbar, a coil terminal of coils respectively wound on the upper surface of stator, and the busbar is connected to the coil terminal.

The busbar is fixedly arranged with a plurality of metal members electrically connected to the coil terminal which is then insulated by an insulator. The busbar takes an approximate shape of a doughnut to correspond to a shape of the stator. The busbar is arranged at a periphery with terminals for connecting the coil terminal.

The shape of a busbar is change in response to a connected electrical power, and in general, the EPS motor is configured such that respective input/output terminals are sequentially arranged to a periphery of the busbar through a 3-phase circuit.

However, there is a disadvantage in a connecting process of a busbar to a coil, in a case the busbar is used to connect the coil, and in miniaturizing a motor because a height of an EPS motor increases as high as a height of the busbar.

Another disadvantage is that a processing time is excessively required to manufacture a busbar, because of a complicated process such as mold-formation of a busbar body using an insulator by formation of a busbar.

BRIEF SUMMARY

The present disclosure is directed to cope with the above-mentioned problems/disadvantages and it is an object of the present disclosure to provide a structure-improved brushless motor configured to improve motor assembly and motor miniaturization.

In one general aspect of the present disclosure, there is provided a motor, the motor comprising:
a motor housing;
a stator mounted inside the motor housing and including a stator core and a coil wound on the stator core;
a rotor rotatably installed at a center of the stator; and
a plate module stacked with a plurality of plates, and coupled to the stator and to an upper surface of a rotor to supply an electric power to the coil.

Preferably, but not necessarily, the plate module may include first to fourth plates each having a same diameter.

Preferably, but not necessarily, the first plate may include first to third through holes each having a first diameter, and a first terminal through hole having a second diameter smaller than the first diameter.

Preferably, but not necessarily, the number of first terminal through hole may be same as a sum of the number of first to third coil through holes.

Preferably, but not necessarily, the number of the first terminal through holes may be 12, and each number of the first to third coil through holes may be 3, such that a total number of first to third coil through holes may be 12.

Preferably, but not necessarily, the second plate may include a fourth coil through hole having a first diameter, and a second terminal through hole having a second diameter smaller than the first diameter.

Preferably, but not necessarily, the number of fourth coil through holes may be 20, and the number of second terminal through holes may be 4.

Preferably, but not necessarily, the third plate may include a fifth coil through hole having a first diameter, and a third terminal through hole having a second diameter smaller than the first diameter.

Preferably, but not necessarily, the number of fifth coil through holes may be 20, and the number of third terminal through holes may be 4.

Preferably, but not necessarily, the fourth plate may include a sixth coil through hole having a first diameter, and a fourth terminal through hole having a second diameter smaller than the first diameter.

Preferably, but not necessarily, the number of sixth coil through holes may be 20, and the number of fourth terminal through holes may be 4.

Preferably, but not necessarily, the second diameter may correspond to a diameter of the coil.

Preferably, but not necessarily, each of the first to fourth plates may take a shape of a ring having an external diameter and a minor diameter.

Preferably, but not necessarily, the first to fourth plates may include at least four (4) ounces of copper.

Preferably, but not necessarily, the minor diameter may be formed greater than a diameter of the rotor.

There is an advantageous effect in the motor according to an exemplary embodiment of the present disclosure in that a motor height can be reduced to provide a further miniaturized motor, because each polarity and common terminal connections of electric power can be enabled by stacking a plurality of plate members instead of the conventionally used complicated structure of busbar.

Another advantageous effect is that productivity of motor assembly can be improved by replacing the complicated process of connecting a distal ends of coils wound on a stator to a terminal of busbar with a process of inserting the distal ends of coils into a plate member, and heating and soldering using a heating gun.

DETAILED DESCRIPTION

Now, a motor according to the exemplary embodiment of the present disclosure will be described in detail with reference to the accompanying drawings.

Figure 1:
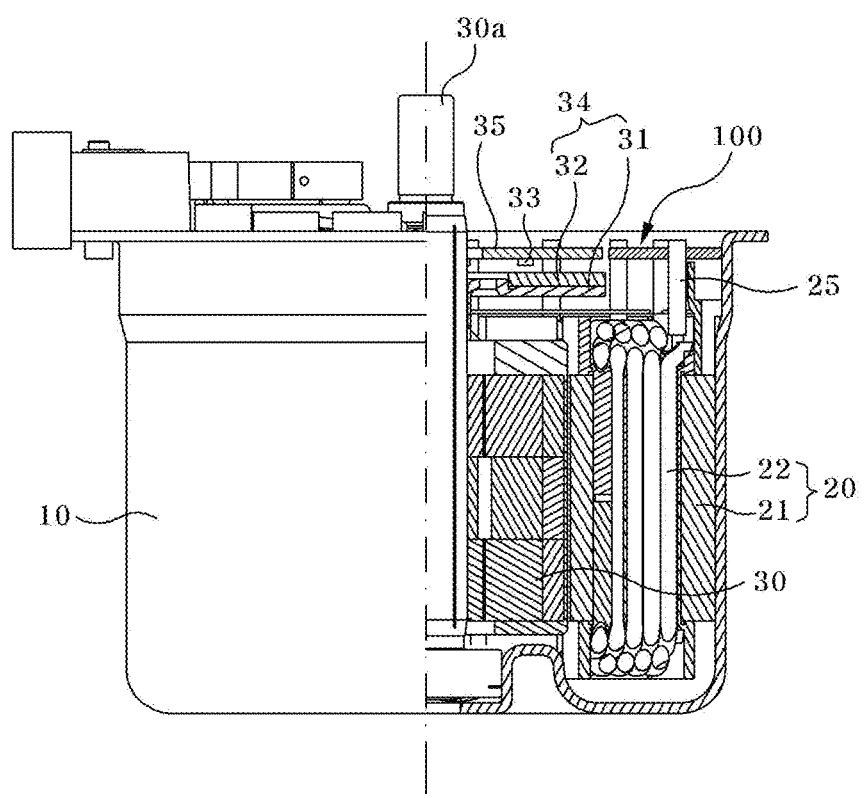
FIG. 1 is a partially cut-out cross-sectional view illustrating a motor according to an exemplary embodiment of the present disclosure.
Figure 2:
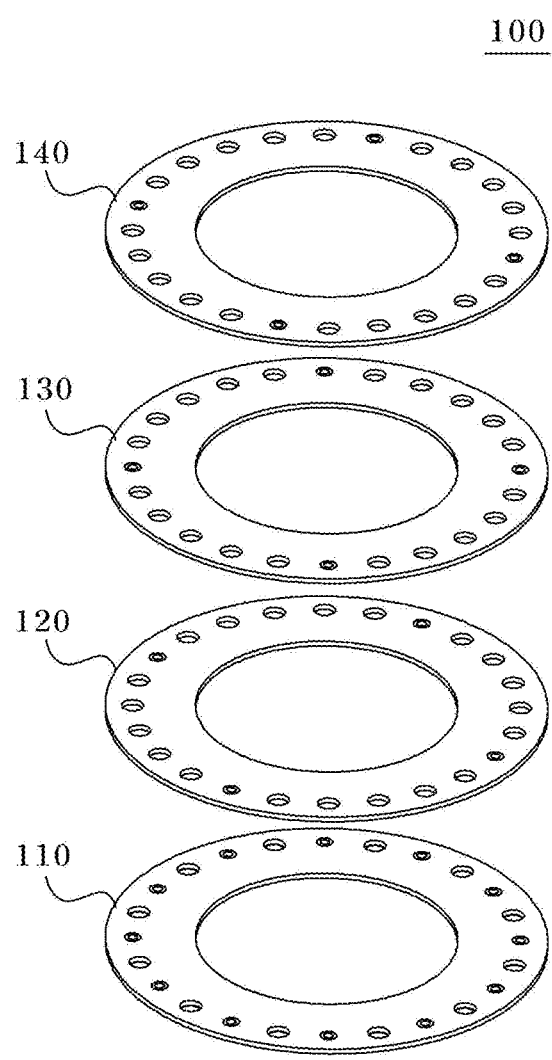
FIG. 2 is an exploded perspective view illustrating a plate module according to an exemplary embodiment of the present disclosure.
Figure 3:
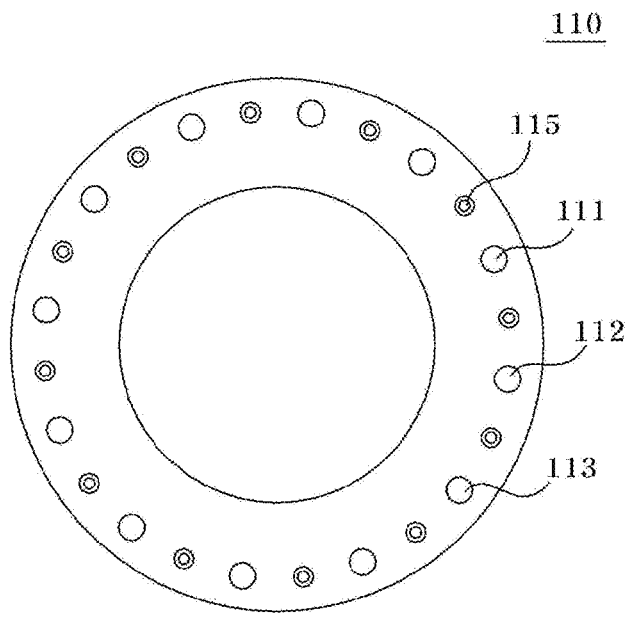
FIG. 3 is a plan view illustrating a first plate of FIG. 2.
Figure 5:
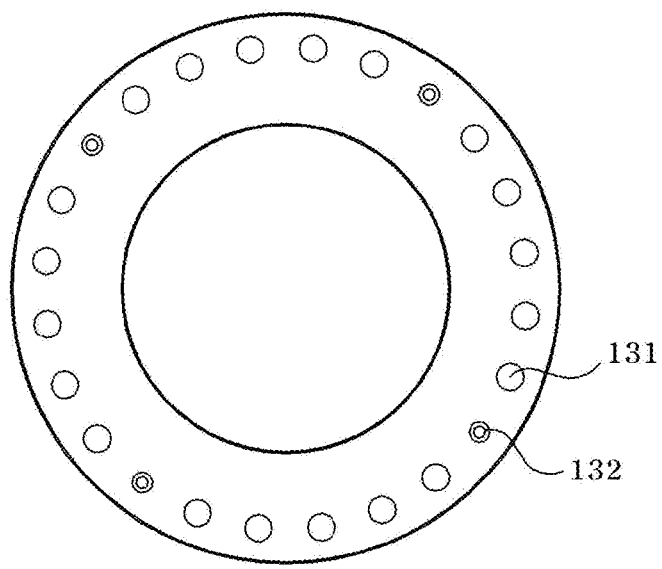
Figure 6:
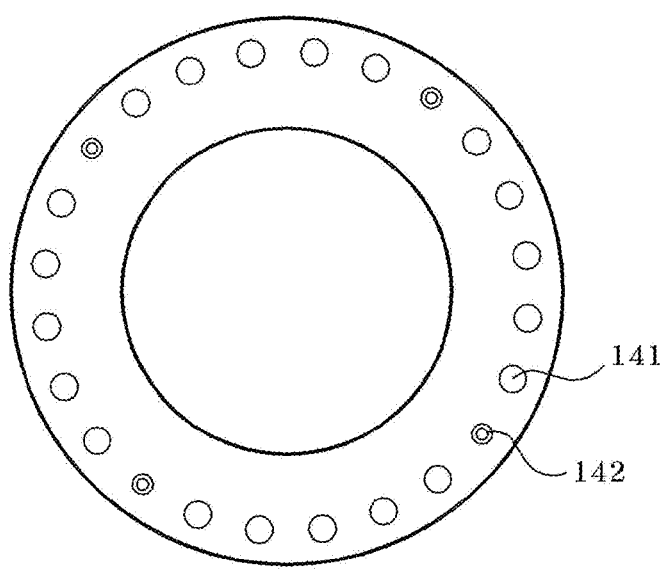
Figure 7:
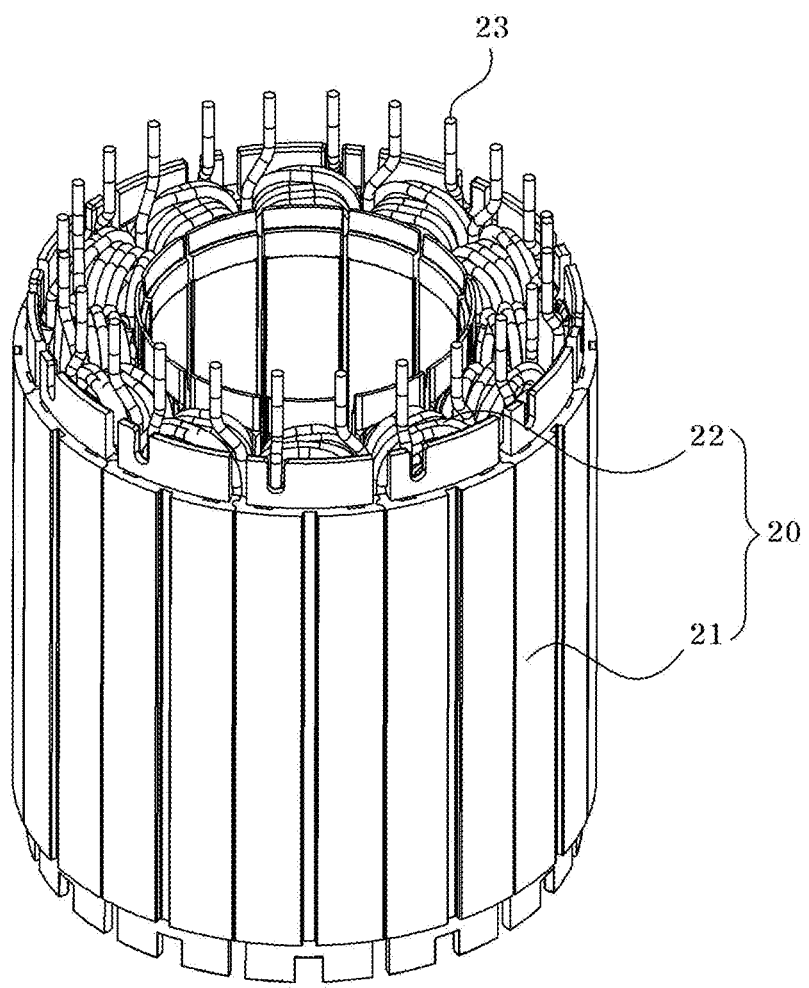
FIG. 7 is a perspective view illustrating a stator core wound with a coil.
Figure 8:
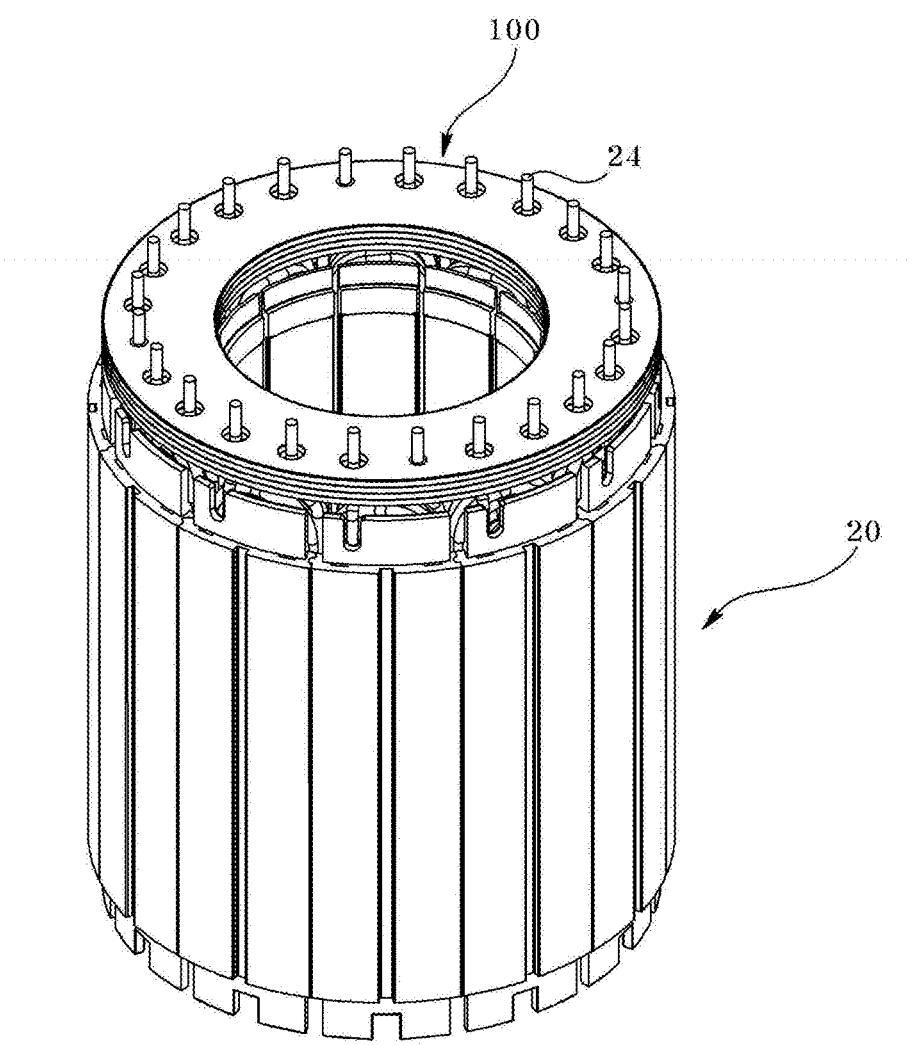
FIG. 8 is a perspective view illustrating a state in which a distal end of a coil wound on a stator core of FIG. 7 is stripped and a plate module inserted into.
Figure 9:
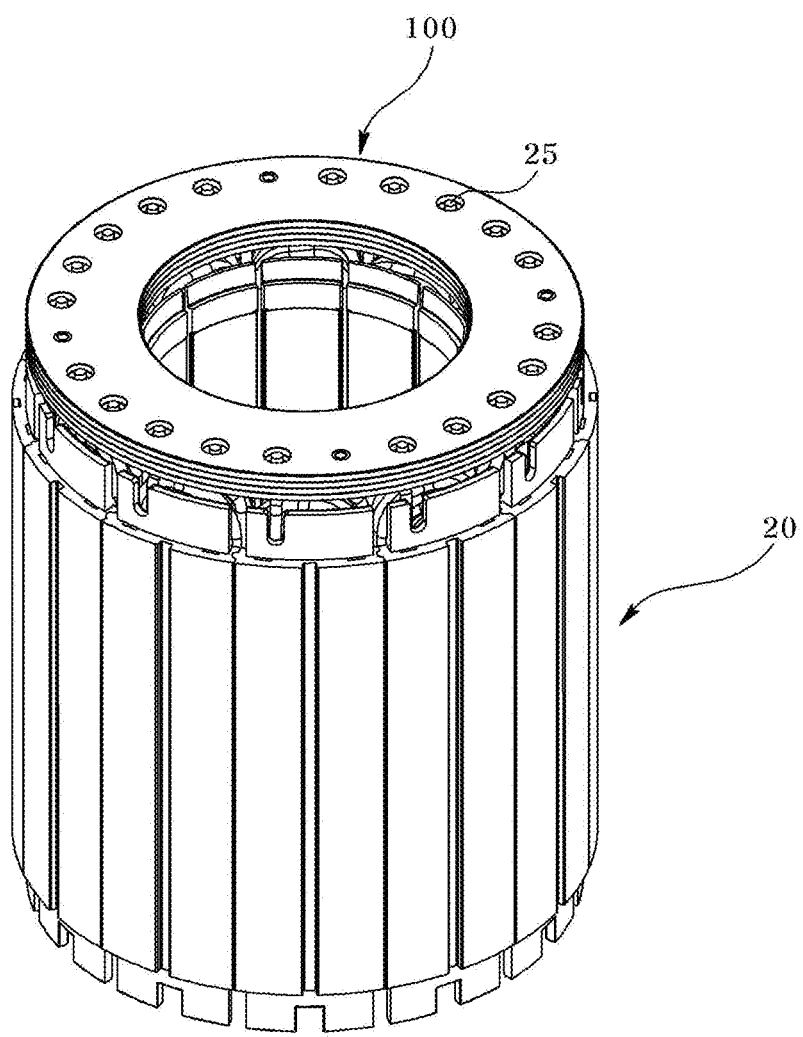
FIG. 9 is a perspective view illustrating a state in which a stripped portion of the coil protruded to an upper surface of the plate module of FIG. 8 is cut out.
Figure 10:
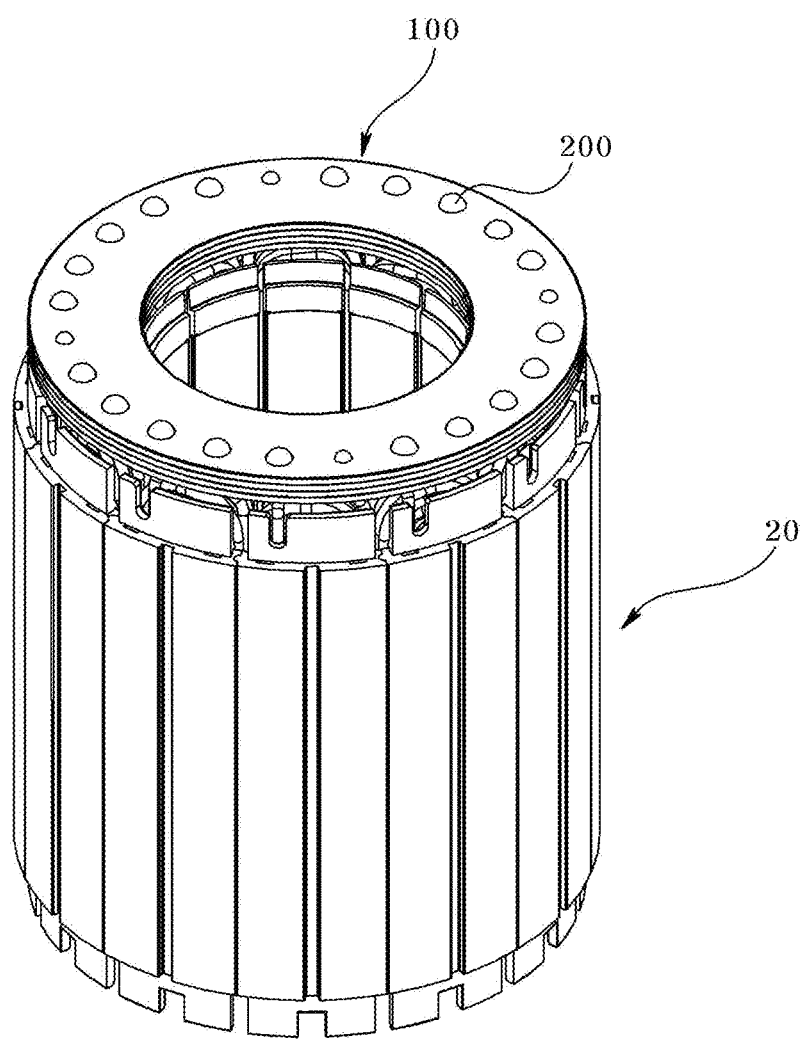
FIG. 10 is a perspective view illustrating a state in which the upper surface of the plate module of FIG. 9 is soldered using a conductive member.

FIG. 1 is a partially cut-out cross-sectional view illustrating a motor according to an exemplary embodiment of the present disclosure, FIG. 2 is an exploded perspective view illustrating a plate module according to an exemplary embodiment of the present disclosure, FIG. 3 is a plan view illustrating a first plate of FIG. 2, FIGS. 4 to 6 are plan views illustrating second to fourth plates of FIG. 2, FIG. 7 is a perspective view illustrating a stator core wound with a coil, FIG. 8 is a perspective view illustrating a state in which a distal end of a coil wound on a stator core of FIG. 7 is stripped and a plate module inserted into, FIG. 9 is a perspective view illustrating a state in which a stripped portion of the coil protruded to an upper surface of the plate module of FIG. 8 is cut out, and FIG. 10 is a perspective view illustrating a state in which the upper surface of the plate module of FIG. 9 is soldered using a conductive member.

Referring to FIG. 1, an EPS motor according to an exemplary embodiment of the present disclosure includes a motor housing (10), a stator (20), and a rotor (30), and may further include a plate module (100) for supplying an electric power to a coil (22) wound on the stator (20).

The motor housing (10) takes an approximate shape of a cylinder, and is formed with at an upper surface with an opening and closed at a bottom surface. The motor housing (10) is installed therein with the stator (20), the rotor (30) and a rotation shaft (30a) rotatably supporting the rotor (30). The stator (20) includes a stator core (21), a coil (22) and a coil terminal (25) formed by stripping a distal end of the coil. The stator core (21) may be provided with a plurality of teeth, and the teeth may be circumferentially wound with the coil (22) while the teeth are mounted with an insulator. The distal end of the coil (22) is stripped to form the coil terminal (25), where the coil terminal (25) may be provided in a cylindrical shape having a predetermined length and a predetermined diameter, as illustrated in FIG. 2.

The rotor (30) is rotatably mounted at a center of the stator (20), and is formed by a plurality of magnets being mounted at a periphery of rotor core. The rotation shaft (30a) is coaxially formed with the rotor (30), where one end of the rotation shaft (30a) is rotatably supported by a bottom bearing mounted at a floor surface of the motor housing (10), and the other end of the rotation shaft (30a) is supported by an upper bearing installed on a cover member (not shown).

A sensing unit (34) includes a plate (31), a sensing magnet (32) and a magnetic element (33). The plate is provided with an approximate shape of a disc, and is fixed at an upper surface by the sensing magnet (32) using an adhesive. The sensing magnet (32) may be centrally provided with a through hole. The magnetic element (33) serves to detect changes in magnetic field of the sensing magnet (32), and is installed opposite to the sensing magnet (32). The magnetic element (33) may be installed on a PCB (Printed Circuit Board) arranged at an upper surface of the rotor (30).

Referring to FIG. 2 again, the plate module (100) is formed by being stacked with first to fourth plates (110~140) each having a same external shape. At this time, each of the first to fourth plates (110~140) takes a ring shape and is centrally formed with a through hole, and a diameter of the through hole may be greater than a diameter of the rotor (30). The through hole may be formed with a size not interfering with the PCB (35) as shown in FIG. 1.

The first plate (110) functions as a common terminal as illustrated in FIG. 3, and may be formed at a periphery with a plurality of through holes. At this time, the through hole may be provided with a first coil through hole (111) having a first diameter, a second coil through hole (112), a third coil through hole (113) and a first terminal through hole (115) having a second diameter smaller than the first diameter. The first to third coil through holes (111~113) and the first terminal through hole (115) may be alternatively arranged as illustrated in the drawing.

That is, the first coil through hole (111) may be followed by the first terminal through hole (115), the second coil through hole (112) may be arranged thereaside, the first terminal through hole (115) thereaside, the third coil through hole (113) thereaside, and the first terminal through hole (115) thereaside in that order. The reason of this arrangement will be explained later.

Figure 4:
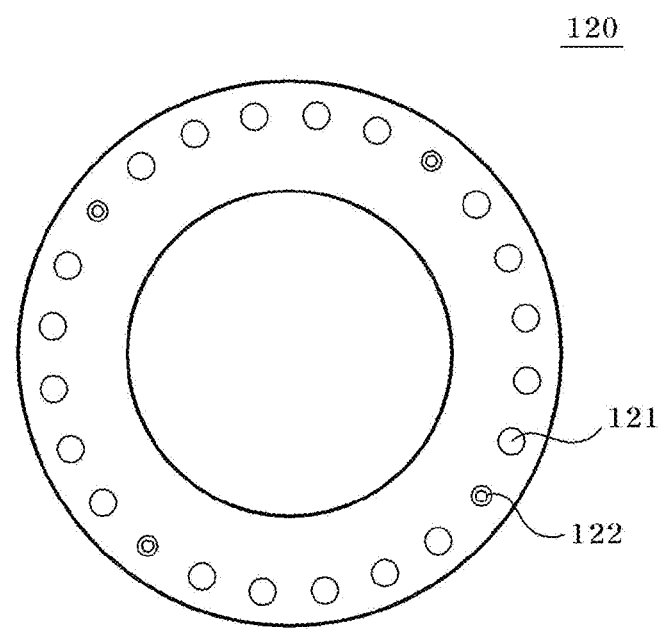
FIGS. 4 to 6 are plan views illustrating second to fourth plates of FIG. 2.

Referring to FIG. 4, the second plate (120) may be provided in a ring shape having a periphery and an inner surface same as those of the first plate (110). The second plate (120) may include a fourth coil through hole (121) having a diameter corresponding to the first diameter, and a second terminal through hole (122) having a second diameter corresponding to that of the first terminal through hole (115).

Referring now to FIG. 5, the third plate (130) may be provided in a ring shape having a periphery and an inner surface same as those of the first plate (110). The third plate (130) may include a fifth coil through hole (121) having a diameter corresponding to the first diameter, and a third terminal through hole (132) having a second diameter corresponding to that of the first terminal through hole (115).

Referring now to FIG. 6, the fourth plate (140) may be provided in a ring shape having a periphery and an inner surface same as those of the first plate (110). The fourth plate (140) may include a sixth coil through hole (121) having a diameter corresponding to the first diameter, and a fourth terminal through hole (142) having a second diameter corresponding to that of the first terminal through hole (115).

The first to fourth terminal through holes (115, 122, 132, 142) may be formed with conductive material, and the second diameter may be configured to have a diameter corresponding to a diameter of the coil (22).

At this time, an inner surface of first to fourth terminal through holes (115, 122, 132, 142) may be conductively connected with the coil (22) passing the first to fourth terminal through holes (115, 122, 132, 142) using a tool such as a hot gun by performing a solder coating in a case heat is applied.

Furthermore, the first to fourth plates (110~140) may be commonly formed at an outer surface or at an inner surface with a conductive layer conductively arranged with the first to fourth terminal through holes (115, 122, 132, 142), and in a case the conductive layer is arranged at an upper surface or a bottom surface, an insulation paint may be coated or painted to inhibit occurrence of an outside short-circuit, and in a case the conductive layer is arranged thereinside, a member wrapping the conductive layer may be formed with an insulation member.

Meanwhile, weight of conductive member instead of thickness or area of the conductive member is important for the conductive layer, and according to an exemplary embodiment of the present disclosure, the conductive member is a copper material, and weight of the copper material may be at least four (4) or more ounces. At this time, diameter and thickness of the plate module (100) may increase or decrease in response to a diameter of the motor, and in a case the weight of the copper which is a conductive material is maintained at four (4) or more ounces, the thickness may be freely adjusted, where each thickness of the plates (110~140) may be configured not to exceed 1 mm at the maximum.

Generally, because the plate module (100) using four (4)-ounce copper is manufactured in a ring shape, an etching process required for formation of a general PCB may be omitted to reduce the manufacturing cost.

Meanwhile, the number of through holes may vary based on connected polarity, and because the motor according to an exemplary embodiment of the present disclosure is connected to a 3-phase electrical power, a total of 24 through holes may be formed for each plate (110~140). Therefore, the first plate (110) may be formed with a total of 12 first terminal through holes (115), and the first to third coil through holes (111~113) may have three (3) holes, so a total of 12 holes may be formed.

Furthermore, each of the second to fourth plates (120~140) has a same shape and structure, and the second plate (120) may have a total of 20 four coil through holes (121) each having a first diameter, and a total of 4 second terminal through holes (122) each having a second diameter. Each of the third and fourth plates (130, 140) may also have a total of 20 fifth and sixth coil through holes (131, 141) each having a first diameter, and a total of four third and fourth terminal through holes (132, 142) each having a second diameter.

Meanwhile, the plate module (100) as noted above is formed by plate-stacking, where when stacking, it is necessary to arrange each through hole at a specific position. That is, as illustrated in FIG. 2, the first plate (110) of common terminal may be arranged at the lowermost side. Furthermore, an upper surface of the first plate (110) may be stacked with the second plate (120) having a first polarity and connected to an electric power source, and the second terminal through hole (122) of the second plate (120) may be arranged opposite to the first coil through hole (111). In the like manner, the third terminal through hole (132) of the third plate (130) may be arranged opposite to the second coil through hole (112), and the fourth terminal through hole (142) of the fourth plate (140) may be arranged opposite to the third coil through hole (113).

Now, a coupling method of the plate module (100) will be described with reference to FIGS. 7 to 10 according to the present disclosure. The present disclosure relates to a brushless motor using a 3-phase (U, V, W) electric power source, and a general construction of the stator (20) has been already described along with FIG. 1.

Referring to FIG. 7, a distal end (23) of coil (22) wound on the stator core (21) may be arranged in an erect state on an upper surface of the stator core while being wrapped in an insulated coating that wraps the coil (22). At this time, the distal end (23) of the coil (22) is arranged at an erect state to a direction parallel with a lengthwise direction of the stator core (21), and the distal end (23) of the coil (22) is made to pass through the plurality of through holes formed on the plate module (100).

A stripped portion (24) formed by stripping the distal end (23) of the coil (22) having passed the first terminal through hole (115) passes through the fourth to sixth coil through holes (121, 131, 141) of the second to fourth plates (120, 130, 140) whereby the conductive connection may be realized only on the first terminal through hole (115).

Furthermore, a stripped portion (24) formed by stripping the distal end (23) of the coil (22) having passed the second terminal through hole (122) of the second plate (120) passes through the fifth to sixth coil through holes (131, 141) of the third and fourth plates (130, 140) whereby the conductive connection may be realized only on the second terminal through hole (122).

Still furthermore, a stripped portion (24) formed by stripping the distal end (23) of the coil (22) having passed the fourth coil through hole (121) of the second plate (120) passes through the third terminal through hole (132) of the third plate (130), and passes the sixth coil through hole (141) of the fourth plate (140), whereby the conductive connection may be realized only on the third terminal through hole (132).

Still furthermore, a stripped portion (24) formed by stripping the distal end (23) of the coil (22) having passed the third coil through hole (113) passes through the fourth and fifth coil through holes (121, 131) of the second and third plates (120, 130), and passes through the fourth terminal through hole (142) of the fourth plate (130, whereby the conductive connection may be realized only on the fourth terminal through hole (142).

Now, once the connection is finished as explained above, the stripped portion (24) protruded to an upper surface of the plate module (100) is removed to form a coil terminal (25), as illustrated in FIG. 9, and a portion of the coil terminal (25) is soldered using a conductive member (200) such as a lead whereby the assembly may be completed.

Furthermore, albeit not being illustrated, as noted above, a periphery of the first to fourth terminal through holes (115, 122, 132, 142) is pre-performed with solder coating, heat is applies using a heat gun after assembly of the plate member (100) is finished, the pre-performed solder coating is melted, and the coil stripped portion (24) having passed the first to fourth terminal through holes (115, 122, 132, 142) may be conductively connected to the first to fourth plates (110~140). At this time, each diameter of the first to fourth terminal through holes (115, 122, 132, 142) has the second diameter corresponding to the diameter of the coil (22), and the first to sixth coil through holes (111, 112, 113, 121, 131, 141) has the first diameter greater than the second diameter, such that if a soldering process using lead is performed on the upper surface as illustrated in FIG. 10, the stripped portion (24) may be conductively connected only to the first to fourth terminal through holes (115, 122, 132, 142).

As apparent from the foregoing, the exemplary embodiment of the present disclosure has an advantageous effect in that a conventional busbar is removed, and same function as that of the busbar can be achieved by coupling of plate module (100) formed by stacking the first to fourth plates (110~140), each having a same ring-shaped external look to thereby enhance the assemble and productivity.

Meanwhile, the abovementioned exemplary embodiment of the present disclosure has illustrated and explained a case where a 3-phase electric power source is applied, such that the number of plates forming the plate module (100) may be increased or decreased if polarities of applied electric power source increase or decrease.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A motor, the motor comprising:
    a stator including a stator core and a coil unit wound on the stator core;
    a rotor rotatably disposed at an inner side of the stator; and
    a plate module coupled to the stator to supply an electric power to the coil unit,
    wherein the plate module includes a first plate, a second plate, a third plate, and a fourth plate stacked;
    wherein the second plate, the third plate, and the fourth plate are electrically connected to the coil unit to supply a 3-phase electrical power;
    wherein the first plate includes at least three coil through holes, and at least three terminal through holes spaced apart from the coil through holes;
    wherein the coil unit is electrically connected with the terminal through holes and electrically insulated from the coil through holes; and
    wherein the at least three coil through holes alternate with the at least three terminal through holes in a circumferential direction of the first plate.

2. The motor of claim 1, wherein the first to fourth plates have a same diameter.

3. The motor of claim 2, wherein the coil through holes include first to third coil through holes formed on the first plate, and the terminal through holes include a first terminal through hole formed on the first plate.

4. The motor of claim 3, wherein the number of first terminal through holes is the same as a sum of the number of first to third coil through holes.

5. The motor of claim 3, wherein the number of the first terminal through holes is 12, and wherein the number of the first coil through holes is 4, the number of second coil through holes is 4, and the number of third coil through holes is 4, such that a total number of first coil through holes, second coil through holes, and third coil through holes is 12.

6. The motor of claim 2, wherein the second plate includes a plurality of fourth coil through holes electrically insulated from the coil unit, and a plurality of second terminal through holes electrically connected with the coil unit.

7. The motor of claim 6, wherein the number of the fourth coil through holes is 20, and the number of the second terminal through holes is 4.

8. The motor of claim 2, wherein the third plate includes a plurality of fifth coil through holes electrically insulated from the coil unit, and a plurality of third terminal through holes electrically connected with the coil unit.

9. The motor of claim 8, wherein the number of the fifth coil through holes is 20, and the number of the third terminal through holes is 4.

10. The motor of claim 2, wherein the fourth plate includes a plurality of sixth coil through holes electrically insulated from the coil unit, and a plurality of fourth terminal through holes electrically connected with the coil unit.

11. The motor of claim 10, wherein the number of the sixth coil through holes is 20, and the number of the fourth terminal through holes is 4.

12. The motor of claim 1, wherein the coil through holes have a first diameter, and the terminal through holes have a second diameter smaller than the first diameter, and
    wherein the second diameter corresponds to a diameter of the coil unit.

13. The motor of claim 2, wherein each of the first to fourth plates takes a shape of a ring having an external diameter and a minor diameter.

14. The motor of claim 13, wherein the first to fourth plates include at least four (4) ounces of copper.

15. The motor of claim 13, wherein the minor diameter is formed greater than a diameter of the rotor.

* * * * *